Patented Sept. 29, 1942

2,297,397

UNITED STATES PATENT OFFICE 2,297,397

PROCESS OF INSOLUBILIZING PROTEIN FIBERS DURING THEIR MANUFACTURE

Antonio Ferretti, Milan, Italy; vested in the Alien Property Custodian

No Drawing. Application March 2, 1940, Serial No. 321,913. In Italy March 30, 1939

6 Claims. (Cl. 18—54)

The object of the present invention is a process for insolubilizing protein fibers, during their manufacture and the fibers obtained by said process.

(1) Propositions have been already known for insolubilizing relatively to water, artificial fibers of proteins by submitting them to the action of chrome salts in aqueous solutions; in particular Mr. A. Millar in his English Patent No. 6,700 A. D. 1898 has proposed to render protein fibers insoluble in water by treating them with a watery solution of 5% of chrome-alum or of bichromate of potash; but these suggestions for insolubilization have not found a practical achievement, because—before my patent application No. 96,470 filed in U. S. of America on August 17, 1936—nobody had yet succeeded in making fibers solely of protein and therefore the product to be submitted actually—and not only on paper—to the action of chrome salts in aqueous solution had yet to be obtained for ascertaining really the insolubilizing effects of the chrome salts.

Therefore, Millar and other researchers, have not even been able to notice that protein fibers cannot be treated in watery solutions containing solely chrome salts, due to the fact that the filaments freshly coagulated, namely not yet insolubilized, do swell enormously in said watery solution and deteriorate in an incurable manner, before the chrome salts can perform their insolubilizing action upon said filaments; in fact protein fibers thus treated lose entirely their tensile resistance, are brittle and therefore useless for textile uses.

(2) In my preceding patent applications (No. 96,470 filed in U. S. of America on August 17, 1936 and No. 191,000 filed in U. S. of America on February 17, 1938) I have proved already that also the treatment of protein filaments with formic aldehyde cannot be carried out in watery solutions of only formic aldehyde, because also in such a case the filaments deteriorate completely before their insolubilization.

In fact, the few researchers, who, before my patents, have uselessly tried to succeed in producing protein fibers, failed in their attempts, not only due to the many errors committed in the other various stages of the process, but also because in the stage of insolubilization they all erroneously thought, that it would be simply sufficient to dip the freshly coagulated filaments in a watery solution of formic aldehyde; they tried simply to apply to protein fibers the already known method for insolubilizing the so-called "Galalith" in watery solutions of formaldehyde.

In fact "Galalith" is rendered insoluble by dipping it in watery baths of formaldehyde, but this product is formed by paracasein, which, among other features, is not soluble in alkalis and is a plastic material, which on being pressed in various dies, is neutral and contains only a small percentage of moisture (20%); therefore it is sufficiently solid after coming out of the press to remain without alterations within a watery solution of formaldehyde.

Casein on the contrary, differently from paracasein, is no plastic material; it must be dissolved in alkali and water and reaches the spinnerets in a solution in which, for each hundred parts of casein, there are about five hundred parts of water; therefore the casein filaments, freshly coagulated, contain yet three hundred parts of water, acid and salts for each hundred parts of casein and said filaments in such a condition are so delicate that the slightest disturbance destroys them completely.

These filaments, when dipped in a watery solution of formaldehyde, swell enormously even to practical dissolution, before the formaldehyde may have time to achieve the insolubilization, which then takes place when the filaments are already completely destroyed.

This action occurs, without taking into account the destructive action of the high percentage of acid present in the filaments during the insolubilizing process, which percentage should be reduced or eliminated with a washing treatment which cannot be applied, as the filaments would immediately dissolve in the water.

In my preceding patents, above recited, this main phase has been solved scientifically and practically: As soon as they have coagulated—namely before being destroyed by the presence of a high percentage of acid—the filaments pass into a first bath of sodium chloride, wherein they get rid of the excess of acid, without any further swelling, that is, they keep in the state of swelling they had reached at the time of their coagulation; immediately afterwards they pass through a second bath of aluminium salts and of sodium chloride, with or without formaldehyde, wherein the filaments are restrained and preliminarily hardened by the astringent action of aluminium salts, this action being helped-on and accelerated by the presence of the sodium chloride, which controls also the astringent action of the aluminium salts, acting namely as a control of the swelling for allowing the aluminium salts to penetrate also the innermost parts of the filaments; without said action only a superficial outer hardening would be obtained which would render brittle the fibers after their desiccation.

As this point comes in the third bath composed of formaldehyde, aluminium salts and sodium chloride, namely when the filaments, freed from the excess of acid and gone back in their swelling without their being damaged, are ready to be subjected to the insolubilizing action of formaldehyde in a bath wherein the presence of the salts of aluminium and of sodium chloride plays the very important part of keeping the filaments in that slight swollen condition required for obtaining a quick and perfect insolubilization.

Of course the freshly coagulated filaments could be insolubilized directly in the third bath stated above, omitting the first and second baths, as the astringent action of the aluminium salts and the regulating action of sodium chloride are instantaneous and therefore the insolubilizing process with formaldehyde can begin regularly and immediately; but this would rapidly soil the baths with acid, which would require frequent neutralizations of a rather expensive bath, whilst, on eliminating instead the excess of acid by means of sodium chloride, the cost is very slight, due to the cheap salt, whose presence is on the other hand so important in the subsequent treatment of insolubilization, and it is therefore convenient to predispose it into the filaments utilizing the first treatment of elimination of the acid by a solution of sodium chloride.

From the above statements it is apparent that the insolubilization of casein fibers is not so simple an operation as thought by the researchers who have attempted in vain the manufacture of protein fibers.

Now I have discovered that the same basic principles reviewed above, should be applied to the protein fibers even when insolubilizing with chrome salts, in order to avoid the deterioration of the fibers, so as to obtain a final product useful in textile industries.

(3) Other researchers have found lately that casein fibers manufactured according to my patents and already insolubilized with formaldehyde, may be subsequently treated with the aqueous solutions of chrome-salts, already mentioned under Paragraph (1) above, thus avoiding the deterioration of the fibers which takes place when that same treatment is applied to fibers of freshly coagulated casein, viz., not first, insolubilized with formic aldehyde.

And not this only, but said chrome treatment applied to fibers which have been precedingly insolubilized with formic aldehyde, greatly improves the resistance of the same fibers to the action of dyes in boiling acid baths; it allows also the obtaining of more solid colours both with dyes in acid as with chrome dyes, and in general an increase of the resistance of the fibers to the action of alkalis or other chemical or physical agents.

Truly chrome treated casein fibers lose their whiteness and take up a greenish blue hue, so that they cannot take up light colours, but the usefulness of the chrome treatment remains very important even when limited to the gamut of dark hues.

The achievement of such good results depends on the fact that the casein fibers already insolubilized with formic aldehyde and preferably already dried, when dipped subsequently in the watery solution of chromium salts, swell only slightly and in a measure required for allowing the salts of chrome to penetrate intimately within the fibers, whereupon the oxide of chrome fixes without damaging them.

All this confirms fully the facts stated in Paragraphs (1) and (2) above.

(4) Therefore the present invention does not concern the treatment with chrome salts of protein fibers which have been precedingly insolubilized with formic aldehyde and other chemicals, but the solving of the whole problem of treating with chrome salts the protein fibers during their manufacture, namely precedingly or simultaneously to their insolubilization with formic aldehyde, but avoiding any damaging of the filaments, which acquire therefore all the properties obtaining from the treatment with chrome salts achieved after their insolubilization with formic aldehyde as stated above in Paragraph (3).

Thus the aim is reached with a great saving in labor, in energy, in steam and processing plant etc. inasmuch as the application of the treatment during the manufacture of the fibers is achieved without requiring any extra expense, barring the final neutralizing process.

(5) I propose therefore that the chrome treatment of the protein filaments freshly coagulated should be made in watery solutions containing not only chrome salts, but also one or more soluble salts, preferably neutral or acid, as for instance: chlorides, sulphates, acetates, formiates, etc. and among all these, preferably sodium chloride and aluminium sulphate.

This being so stated and disclosed, the practice of the present invention may be carried-on in the following ways.

(A) It is unadvisable to add salts of chrome to the coagulating bath containing sulphuric acid, sodium sulphate or other salts, as in the washing of the fibers which follows immediately, there would result a high loss of non-fixed chrome salts; further it is preferable to avoid the chrome treatment in the presence of a high percentage of acid, even when the latter does not damage the filaments in the short time between coagulation and subsequent washing.

(B) On the same grounds it is preferable to avoid the chrome-salts treatment within the washing bath containing sodium chloride or other salts.

(C) The ribbon of filaments coagulated in the bath, stated under (A) above, and stripped of its acid with the passage through the washing bath specified under (B) above is carried preferably under a certain tension, through a watery solution of sulphate of aluminium and sodium chloride or of other salts, for instance:

| | Grams |
|---|---|
| Aluminium sulphate per liter of bath | 180–200 |
| Sodium chloride | 150–160 |

In such a bath may be added the soluble basic chrome salts, preferably chrome sulphate in the proportion of 50 gr. per liter of bath, in replacement of 50 gr. of aluminium sulphate.

Having chrome salts in this bath, the content of aluminium sulphate in it may be further reduced, replacing it with further sulphate of chromium, but this would increase uselessly the production cost, therefore it is preferable to replace it with a greater amount of sodium chloride when the bath should be so modified.

One can also entirely replace in this bath the aluminium sulphate, increasing to 100–150 gr. per liter the chrome sulphate and increasing also the amount of sodium chloride, which would be preferably present in the bath in a quantity greater than that of chrome sulphate; in such a case, however, the bath has less astringent power on the filaments, due to the lack of aluminium sulphate, and therefore this modification is not to be preferred also because it increases the cost of production.

The temperature of these baths should be higher than 25° C., preferably 55-65° C.

(D) Instead of adding the salts of chrome to the bath as stated under (C) above, they may be added in the bath collecting the freshly cut fibers, which bath may be of the following composition:

|  | Grams |
|---|---|
| Aluminium sulphate per liter of bath | 130-140 |
| Sodium chloride per liter of bath | 140-150 |
| Chrome sulphate per liter of bath | 50- 60 |

This bath should have a temperature maintained above 25° C., preferably 35-40° C. for one hour, rising thereafter to 60-70° C. and maintained so for 6 to 9 hours.

(E) Should it be desired to associate the chrome treatment with the formic aldehyde, the latter may be added in any of the above stated baths, preferably in the proportion of 40 gr. of 100% formic aldehyde per liter of bath.

(F) It should be noted that the best results in the quality of the protein fibers are achieved by carrying-on the insolubilization simultaneously with chrome and with formic aldehyde, and therefore the simplest and cheapest method for achieving said results is that of treating the fibers in a vacuum boiler in the last insolubilizing bath, composed for instance as follows:

|  | Grams |
|---|---|
| Aluminium sulphate per liter of bath | 40- 50 |
| Chrome sulphate per liter of bath | 50- 60 |
| Sodium chloride per liter of bath | 180-200 |
| Formic aldehyde 100% per liter of bath | 35- 40 |

Temperature of the bath above 25° C., preferably at 70° C., for 6 to 9 hours.

In this case the protein fibers are manufactured without any change in regard to what was stated in my preceding patents quoted above, and this right down to the last but one stage of the process, while in the last stage the chrome salts are added to the insolubilizing bath so as to obtain the composition given above by way of example.

The chrome-treated fibers, besides requiring ample subsequent washing, should be neutralized for getting rid of the traces of acid which may be retained on the fibers, and for this object, sodium borate, sodium bicarbonate, hydrate of ammonium or other suitable alkali may be used.

The process specified is applied to the production of fibers from animal and vegetable proteins in general and particularly to fibers of milk casein, soja protein or to a mixture in any convenient proportion of both.

The chromium sulphate is specified as a preferred example, but I can use also chrome alum, chrome chloride and other salts capable of providing solutions of chrome oxide or tanning compounds containing chrome salts; the basic feature of the solutions of chrome oxide may be supplemented by any known means without thereby exceeding the limits of the present invention.

Having now particularly described and ascertained the nature of my said invention and in what manner the same is to be performed, I declare that what I claim is:

1. In a process for the commercial production of artificial textile fibers from a viscous maturated alkaline protein solution, and following the step of multiple spinning thereof with acid coagulation of the filaments; the step of then insolubilizing the freshly coagulated acid-containing group of spun filaments, namely, by subjecting them promptly to treatment in an aqueous insolubilizing bath which contains a soluble chrome compound, which has an effective insolubilizing action upon the soft protein filaments, taken from the group consisting of chrome sulfate, chloride and alum; and of sodium chloride acting to restrain swelling of filaments during insolubilizing.

2. In a process for the commercial production of artificial textile fibers from a viscous maturated alkaline casein solution, and following the step of multiple spinning thereof with acid coagulation of the filaments; the step of next insolubilizing the freshly coagulated acid-containing group of spun filaments by subjecting them to treatment in an aqueous insolubilizing bath which contains a soluble chrome compound which is a basic salt of the group consisting of the sulphates, chlorides and alums, and has an effective insolubilizing action on the soft protein filaments, together with a proportion of sodium chloride for controlling the insolubilization, and aluminum sulphate for hardening them.

3. A process as in claim 2 and wherein with the insolubilizing chrome compound is included in the bath a proportion of formaldehyde for insolubilizing.

4. In a process for the commercial production of artificial textile fibers from a viscous maturated alkaline casein solution, which comprises spinning such casein solution into filaments and coagulating such filaments in an acid coagulating bath; insolubilizing the freshly coagulated filaments after leaving said bath; by subjecting them to treatment in an aqueous insolubilizing bath which contains a chrome sulphate, sodium chloride, and aluminum sulphate.

5. In a process for the commercial production of artificial textile fibers from a viscous maturated alkaline casein solution, which comprises spinning such casein solution into filaments and coagulating such filaments in an acid coagulating bath; insolubilizing the freshly coagulated filaments after leaving said bath; by subjecting them to treatment in an aqueous insolubilizing bath which contains a chrome sulphate, sodium chloride, and formaldehyde.

6. A process as in claim 5 and wherein the bath contains aluminum sulphate.

ANTONIO FERRETTI.